United States Patent [19] [11] 3,917,478
Moser et al. [45] Nov. 4, 1975

[54] HERBICIDAL COMPOSITIONS AND METHODS UTILIZING THIADIAZOLIS UREAS

[75] Inventors: Hans Moser, Basel; Christian Vogel, Binningen, both of Switzerland

[73] Assignee: Ciba-Geigy Corporation, Ardsley, N.Y.

[22] Filed: Apr. 25, 1974

[21] Appl. No.: 464,088

Related U.S. Application Data

[62] Division of Ser. No. 123,446, March 11, 1971, Pat. No. 3,822,280.

[30] Foreign Application Priority Data

Mar. 19, 1970 Switzerland.......................... 4159/70

[52] U.S. Cl............................................ 71/90; 71/92
[51] Int. Cl.²............................................ A01N 9/12
[58] Field of Search.................................... 71/90, 92

[56] References Cited
UNITED STATES PATENTS

| | | | |
|---|---|---|---|
| 3,565,901 | 2/1971 | Cebalo | 260/306.8 |
| 3,673,203 | 6/1972 | Miller | 71/90 |
| 3,686,198 | 8/1972 | Metzger et al. | 71/90 |
| 3,784,555 | 1/1974 | Cebalo et al. | 71/90 |
| 3,840,551 | 10/1974 | Sasse et al. | 71/90 |

Primary Examiner—James O. Thomas, Jr.
Attorney, Agent, or Firm—Harry Falber

[57] ABSTRACT

New ureas of the Formula

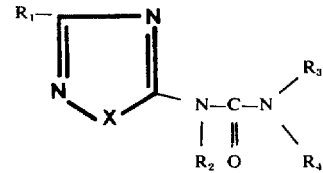

wherein
$R_1$ represents a lower α-halogen alkyl radical
$R_2$ and $R_3$ each independently represent hydrogen or a lower alkyl radical
$R_4$ represents a lower alkyl radical that is unsubstituted or substituted by cyano or alkoxy, a cycloalkyl radical or alkinyl radical
X represents oxygen or sulphur
and processes for their preparation are given. These ureas have herbicidal activity and compositions containing them can be used for the control of gramineous and dicotyledonous weeds.

15 Claims, No Drawings

HERBICIDAL COMPOSITIONS AND METHODS UTILIZING THIADIAZOLIS UREAS

This is a division of application Ser. No. 123,446, filed on Mar. 11, 1971, now U.S. Pat. No. 3,822,280.

DESCRIPTION OF THE INVENTION

The present invention concerns new ureas, process for the production thereof as well as well as herbicidal agents containing such ureas as active ingredients, and method for the control of gramineous and dicotyledonous weeds using the new active substances or agents containing them.

The new ureas correspond to the Formula I

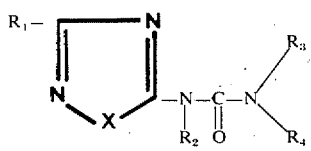

In this formula:
- $R_1$ represents a lower α-halogen-alkyl radical,
- $R_2$ and
- $R_3$ each indepentently represent hydrogen or a lower alkyl radical,
- $R_4$ represents a lower alkyl radical that is unsubstituted or substituted by cyano or alkoxy, a cycloalkyl radical, an alkoxy radical, an alkenyl, halogenoalkenyl or alkinyl radical,
- X represents oxygen or sulphur.

In general Formula I, as lower alkyl radicals $R_1$, $R_2$, $R_3$ and $R_4$ are meant straight or branched chain radicals having 1 to 6 carbon atoms such as, for example, methyl, ethyl, n-propyl, isopropyl, n-butyl, sec-butyl, tert-butyl as well as pentyl and hexyl radicals. The lower α-halogen-alkyl radicals $R_1$ contain 1 to 3 halogen atoms in the first carbon atom and comprise radicals such as chloromethyl, dichloromethyl, trichloromethyl, trifluoromethyl, fluorodichloromethyl, bromomethyl, dibromomethyl, α-chloroethyl, α,α-dichloroethyl, α-chloro-n-propyl, 1,1-dichloro-3-methylbutyl, etc. A cycloalkyl radical $R_4$ has 3 to 10 carbon atoms, preferably 3 to 6 carbon atoms; suitable are the cyclopropyl, cyclobutyl, cyclopentyl and cyclohexyl radicals. Such a cycloalkyl radical can be mono- or poly-substituted by lower alkyl, preferably by methyl and ethyl. An alkoxy radical $R_4$ is one having 1 to 4 carbon atoms, for example methoxy, ethoxy, n-propoxy, isopropoxy, or a butoxy radical. Such alkoxy radicals also designate the substituents of a lower alkyl radical $R_4$. Suitable as alkenyl and halogenoalkenyl radicals $R_4$ are, in particular, the allyl, methallyl or a propenyl radical which may be mono- or poly-substituted by chlorine and/or bromine. The propinyl radical (propargyl radical) or an alkyl propinyl radical are preferred as alkinyl radicals.

The new ureas of the Formula I are produced according to the instant invention by converting an amine of the Formula II

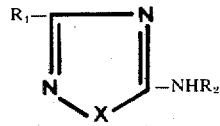

either with a halogeno-carbonic acid ester or with phosgene in the presence of an acid-binding agent into a carbamic acid derivative and reacting this with a amine of the Formula III:

Chloro-carbonic acid phenyl esters and chloro-thiocarbonic acid esters are preferred as halogeno-carbon acid esters; whereby the following carbamic acids, f example, are obtained in good yields as intermedia products:

- N-[3-trifluoromethyl-1,2,4-oxadiazolyl(5)]-carbamic acid-phenyl ester
- N-[3-trifluoromethyl-1,2,4-thiadiazolyl(5)]-carbamic acid-phenyl ester
- N-[3-trichloromethyl-1,2,4-oxadiazolyl(5)]-carbamic acid-phenyl ester
- N-[3-trifluoromethyl-1,2,4-thiadiazolyl(5)]-carbamic acid-phenyl ester
- N-[3-dichloromethyl-1,2,4-thiadiazolyl(5)]-carbamic acid-phenyl ester as well as the corresponding N-[3-trihalogenomethyl-1,2,4-oxa- and thi diazolyl(5)]carbamoyl chlorides and
N-[3-dihalogenomethyl-1,2,4-thiadiazolyl(5)]-carbamoyl chlorides.

As acid-binding agents, preferably tertiary amine such as trialkyl amines, pyridine bases, etc., are used a well as inorganic bases such as the hydroxides and ca bamates of alkali and alkaline earth metals. The rea tion temperatures are between 0° and 150°C.

The reaction of the resultant carbamic acid deriv. tives with a primary or secondary amine of the formu III takes place at temperatures between −40° ar 150°C, preferably between 0° and 100°C.

The new ureas of Formula I in which $R_3$ represen hydrogen can be produced by a modification of tl process according to the invention by reacting a amine of Formula II with an isocyanate of the formu $R_4NCO$.

The processes described are performed in the pre ence of solvents or diluents which are inert to the rea tion components, suitable are, for example, the follo ing: aliphatic and aromatic hydrocarbons and halog nated hydrocarbons, in particular benzene, toluene, x lene, chloroform, chlorobenzene; ether and ether-ty compounds, e.g., dioxane, tetrahydrofuran; N,N-dia kyl amides such as dimethyl formamide, diethyl for amide; ketones such as, e.g., acetone, methyl ethyl ke tone, cyclohexanone; nitriles such as acetonitrile, et Furthermore, the new ureas of the Formula I are o tained by reacting an amine of the Formula II with carbamoyl halide of the Formula

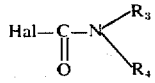

herein $R_3$ represents a lower alkyl radical, and $R_4$ has the meanings given for Formula I, in the presence of acid-binding agents.

Some of the amines of Formula II are known, the others can be produced by known methods. The amines of Formula II in which X represents oxygen, can be produced by reacting trichloro- or trifluoro-acetamidine (a) with cyanogen bromide, or (b) with trichloroacetanhydride to the corresponding 3-trihalogenomethyl-trichloromethyl-1,2,4-oxadiazole and subsequently using an amine of the Formula $NH_2R_2$ to replace the trichloromethyl group by the group —$NHR_2$. For these reactions, condensing agents are required, such as for example tertiary amines, N,N-dialkyl formamide, inorganic bases, etc. As solvents or diluents, in addition to the above-mentioned, also alkanols, e.g., methanol, ethanol and isopropanol may be used.

The new ureas of Formula I have excellent herbicidal properties and are suitable for the control of gramineous and latifoliate weeds in the most varied cultivated plantations. Even annual and perenial weeds which are deep rooted and difficult to control are damaged in their growth or destroyed by these active substances. Thus the new ureas of Formula I can be employed in low concentrations for the selective control of weeds, for example for the control of chamomile varieties (Matricaria spp.), Galium aparine, wild parsnip (Pastinaca sativa), pig weed varieties, e.g., Amaranthus spp., mustard varieties (Sinapis spp.), grasses such as Echinochloa spp., Lolium spp., millet varieties (Panicum spp.), in grain, maize, soya bean, sorghum, cotton, root and tuber crops, and fodder plantations. The ureas of Formula I may be applied before emergence of the plants (preemergence) and also after emergence of the plants (postemergence). In high concentrations, i.e., above 5 kg of active substance per hectare, the new active substances can be used for the complete destruction and prevention of unwanted plant growth.

The herbicidal effect of the active substances according to the invention was determined by the following tests:

1. Herbicidal effect before emergence of the plants a. The active ingredients are mixed with the soil in a seed bed in a concentration of 100 mg of active ingredient per liter of soil. The following test plants were sown in soil (seed trays):

oats (avena sativa), Italian rye-grass (Lolium multiflorum), millet (Setaria italica), mustard (Sinapis alba), vetch (Vicia sativa), tomato (Solanum lycopersicum).

The trays are then kept in greenhouse at 22°–25°C and 50–70 % humidity. The test is evaluated after 20 days according to the following scale of 9:

1 = plants dead
2–4 = intermediate stages of damage (above 50 %)
5 = 50 % damage
6–8 = intermediate stage of slight damage (below 50 %)
9 = plants undamaged = control.

| Active ingredients: | Oats | Rye-grass | Millet | Mustard | Vetch | Tomato |
|---|---|---|---|---|---|---|
| N-[3-trifluoromethyl-1,2,4-thiadiazolyl(5)]-N'-methyl-urea | 1 | 1 | 1 | 1 | 2 | — |
| N-[3-trifluoromethyl-1,2,4-thiadiazolyl(5)]-N',N'-di-methyl-urea | 1 | 1 | 1 | 1 | 2 | 1 |
| N-[3-trichloromethyl-1,2,4-thiadiazolyl(5)]-N-methyl-N'-cyclopropyl-urea | 1 | 1 | 1 | 1 | 4 | 2 |
| N-[3-trichloromethyl-1,2,4-thiadiazolyl(5)]-N'-methyl-urea | 3 | 3 | 2 | 2 | — | 2 |
| N-[3-trichloromethyl-1,2,4-thiadiazolyl(5)]-N',N'-dimethyl-urea | 2 | 3 | 1 | 1 | 2 | 1 |
| N-[3-trichloromethyl-1,2,4-thiadiazolyl(5)]-N-methyl-N'-ethyl-urea | 2 | 3 | 3 | 2 | — | 2 |
| N-[3-trichloromethyl-1,2,4-thiadiazolyl(5)]-N-methyl-N'-N'-dimethyl-urea | 3 | 1 | 1 | 1 | — | 1 |
| N-[3-trifluoromethyl-1,2,4-thiadiazolyl(5)]-N-methyl-N'-cyclopropyl-urea | 2 | 1 | 1 | 1 | 3 | 1 |
| N-[3-trifluoromethyl-1,2,4-thiadiazolyl(5)]-N-methyl-N'-ethyl-urea | 2 | 1 | 1 | 1 | 3 | 1 |
| N-[3-trifluoromethyl-1,2,4-thiadiazolyl(5)]-N-methyl-N'-isopropyl-urea | 2 | 2 | 1 | 1 | 2 | 1 |
| N-[3-trifluoromethyl-1,2,4-thiadiazolyl(5)]-N'-methyl-N'-(1-methyl-propin-3)-yl-urea | 1 | 1 | 1 | 1 | — | 1 |
| N-[3-trichloromethyl-1,2,4-oxadizolyl(5)]-N'-methyl-urea | 3 | 3 | 2 | 1 | 3 | 1 |
| N-[3-trichloromethyl-1,2,4-oxadiazolyl(5)]-N'-methyl-N'-methoxy-urea | 3 | 3 | 2 | 1 | 2 | 2 |
| N-[3-trifluoromethyl-1,2,4-oxadiazolyl(5)]-N,N'-di-methyl-urea | 2 | 6 | 2 | 4 | 2 | 8 |
| N-[3-trichloromethyl-1,2,4-oxadiazolyl(5)]-N,N'-di-methyl-urea | 2 | 1 | 1 | 1 | 2 | 2 |
| N-[3-trifluoromethyl-1,2,4-oxadiazolyl(5)]-N',N'-di-methyl-urea | 3 | 1 | 2 | 1 | 2 | 2 |

| Active ingredients: | Oats | Rye-grass | Millet | Mustard | Vetch | Tomato |
|---|---|---|---|---|---|---|
| N-[3-trifluoromethyl-1,2,4-thiadiazolyl(5)]-N,N'-dimethyl-urea | 1 | 1 | 1 | 1 | 2 | 1 |
| N-[3-trifluoromethyl-1,2,4-thiadiazolyl(5)]-N'-methyl-N'-methoxy-urea | 1 | 1 | 1 | 1 | 1 | 1 |
| N-[3-trifluoromethyl-1,2,4-thiadiazolyl(5)]-N-methyl-N'-ethyl-urea | 1 | 1 | 1 | 1 | 2 | 1 |
| N-[3-trifluoromethyl-1,2,4-thiadiazolyl(5)]-N,N',N'-trimethyl-urea | 1 | 1 | 1 | 1 | 2 | 1 |
| N-[3-trichloromethyl-1,2,4-thiadiazolyl(5)]-N-ethyl-N'-methyl-urea | 1 | 1 | 1 | 1 | 7 | 1 |
| N-[3-trifluoromethyl-1,2,4-thiadiazolyl(5)]-N-ethyl-N'-methyl-urea | 1 | 1 | 1 | 1 | 1 | 1 |
| N-[3-trifluoromethyl-1,2,4-thiadiazolyl(5)]-N-methyl-N'-n-propyl-urea | 1 | 1 | 2 | 1 | 3 | 1 |
| N-[3-dichloromethyl-1,2,4-thiadiazolyl(5)]-N,N'-dimethyl-urea | 1 | 1 | 1 | 1 | 2 | 1 |
| N-[3-dichloromethyl-1,2,4-thiadiazolyl(5)]-N,N',N'-trimethyl-urea | 1 | 2 | 2 | 2 | 3 | 2 |
| N-[3-dichloromethyl-1,2,4-thiadiazolyl(5)]-N-methyl-N'-ethyl-urea | 1 | 2 | 2 | 1 | 3 | 2 |
| N-[3-dichloromethyl-1,2,4-thiadiazolyl(5)]-N-methyl-N'-isopropyl-urea | 3 | 3 | 3 | 1 | 3 | 2 |
| N-[3-dichloromethyl-1,2,4-thiadiazolyl(5)]-N-methyl-N'-(1''-methyl-propinyl)-urea | 3 | 3 | 2 | 1 | 3 | 2 |
| N-[3-dichloromethyl-1,2,4-thiadiazolyl(5)]-N'-methyl-urea | 1 | 1 | 1 | 1 | 2 | 2 |
| N-[3-dichloromethyl-1,2,4-thiadiazolyl(5)]-N',N'-dimethyl-urea | 1 | 2 | 1 | 1 | — | 1 | b. Directly after sowing the test plants, the active substances are applied to the surface of the soil as an aqueous suspension abtained from a 25 % wettable powder. The seed trays are then kept at 22°–23°C and 50–70 % relative humidity. After 28 days the test is evaluated. The following test plants were used:

Lolium multiflorum
Setaria italica
Echinochloa crus galli
Sinapis alba
Galium aparine
Pastinaca sativa
Poa trivialis
Alopecurus myosuroides
Digitaria sangualis
Ipomoea purpurea
Vicia sativa The amounts applied in this test are found in the following table. The following scale of 9 was used for the evaluation:

1 = plants dead
2–4 = intermediary stages of damage (above 50 %)
5 = 50 % damage
6–8 = intermediary stage of slight damage (below 50 %)
9 = plants undamaged = control Composition of the 25 % wettable powder:

25 parts of active substance, 10 parts of sodium aluminium silicate, 0.6 part of sodium dibutylnaphthylsulphonate, 1.0 part of naphthalene sulphonic acid/formaldehyde condensation product 3:2:1, 63.4 parts of kaolin. These wettable powders are suspended in an amount of water corresponding to 1000 liters per hectare.

The following compounds have been tested as active substances:

1. N-[3-trifluoromethyl-1,2,4-thiadiazolyl(5)]-N,N'-dimethyl-urea
2. N-[3-trifluoromethyl-1,2,4-thiadiazolyl(5)]-N',N'-dimethyl-urea
3. N-[3-trifluoromethyl-1,2,4-thiadiazolyl(5)]-N'-methyl-N'-methoxy-urea
4. N-[3-trifluoromethyl-1,2,4-thiadiazolyl(5)]-N-ethyl-N'-methyl-urea
5. N-[3-trifluoromethyl-1,2,4-thiadiazolyl(5)]-N',N'-dimethyl-urea
6. N-[3-dichloromethyl-1,2,4-thiadiazolyl(5)]-N',N'-dimethyl-urea
7. N-[3-dichloromethyl-1,2,4-thiadiazolyl(5)]-N'-methyl-urea
8. N-[3-dichloromethyl-1,2,4-thiadiazolyl(5)]-N',N'-dimethyl-urea
9. N-[3-methyl-1,2,4-thiadiazolyl(5)]-N'-methyl-urea
(Known from the Dutch patent specification open to public inspection No 68,13438 (Bayer)
10. N-[3-methyl-1,2,4-thiadiazolyl(5)]-N',N'-dimethyl-urea (Known from the Dutch patent specification open to public inspection No 68,13438 (Bayer)
11. N-[5-methyl-1,3,4-thiadiazolyl(2)]-N'-methyl-urea (Known from the Dutch patent specification open to public inspection No 68,13437 (Bayer)
12. N-[5-methyl-1,3,4-thiadiazolyl(2)]-N'-isopropyl-urea (Known from the Dutch patent specification open to public inspection No 68,13437 (Bayer))

Alopecurus myosuroides
Setaria italica

| active substance No | amount applied in kg/ha | Lolium multifl. | Setaria italica | Echinoch. crus galli | Sinapis alba | Calium aparine | Pastinaca sativa | Poa trivialis | Alopecurus myos | Digitaria sanguin. |
|---|---|---|---|---|---|---|---|---|---|---|
| 1 | 1 | 3 | 1 | 3 | 1 | — | 2 | — | — | — |
|  | 2 | 1 | 1 | 3 | 1 | 3 | 1 | — | — | — |
|  | 4 | 1 | 1 | 2 | 1 | 2 | 1 | — | — | — |
| 2 | 1 | 2 | 4 | 3 | 2 | 3 | 1 | — | — | — |
|  | 2 | 1 | 2 | 2 | 1 | 3 | 1 | — | — | — |
|  | 4 | 1 | 1 | 1 | 1 | 1 | 1 | — | — | — |
| 3 | 0.5 | 2 | 1 | 2 | 1 | 3 | 1 | 3 | 7 | 2 |
|  | 1 | 2 | 1 | 2 | 1 | 1 | 1 | 2 | 3 | 2 |
|  | 2 | 1 | 1 | 1 | 1 | 2 | 1 | 1 | 2 | 2 |
| 4 | 0.5 | 5 | 2 | 7 | 5 | 6 | — | 1 | 2 | 3 |
|  | 1 | 3 | 2 | 3 | 3 | 4 | — | 1 | 2 | 2 |
|  | 2 | 3 | 1 | 2 | 1 | 3 | — | 1 | 2 | 1 |
| 5 | 0.5 | 3 | 5 | 8 | 1 | 4 | 2 | 9 | 4 | 9 |
|  | 1 | 3 | 5 | 4 | 1 | 4 | 1 | 7 | 3 | 8 |
|  | 2 | 2 | 2 | 2 | 1 | 2 | 1 | 5 | 2 | 5 |
| 6 | 0.5 | 6 | 9 | 3 | 2 | 6 | 9 | 3 | 3 | 8 |
|  | 1 | 3 | 2 | 2 | 1 | 5 | 8 | 1 | 3 | 2 |
|  | 2 | 2 | 2 | 2 | 1 | 2 | 3 | 1 | 2 | 2 |
| 7 | 0.5 | 6 | 4 | 3 | 3 | 8 | 7 | 2 | 3 | 5 |
|  | 1 | 1 | 1 | 2 | 1 | 5 | 5 | 1 | 2 | 2 |
|  | 2 | 1 | 1 | 2 | 1 | 3 | 2 | 1 | 2 | 2 |
| 8 | 0.5 | 2 | 1 | 3 | 1 | 8 | 7 | 1 | 2 | 1 |
|  | 1 | 2 | 1 | 2 | 1 | 2 | 2 | 1 | 2 | 1 |
|  | 2 | 2 | 1 | 1 | 1 | 2 | 2 | 1 | 1 | 1 |
| 9 | 0.5 | 9 | 9 | 9 | 4 | 8 | 7 | 4 | 8 | 9 |
|  | 1 | 8 | 3 | 7 | 2 | 4 | 5 | 3 | 3 | 8 |
|  | 2 | 7 | 2 | 7 | 1 | 3 | 2 | 1 | 3 | 7 |
| 10 | 0.5 | 9 | 9 | 8 | 8 | 9 | 5 | 3 | 8 | 9 |
|  | 1 | 8 | 9 | 8 | 4 | 7 | 4 | 2 | 6 | 8 |
|  | 2 | 6 | 2 | 4 | 2 | 4 | 3 | 1 | 3 | 6 |
| 11 | 0.5 | 9 | 9 | — | 9 | — | — | — | — | — |
|  | 2 | 9 | 9 | — | 9 | — | — | — | — | — |
|  | 5 | 9 | 9 | — | 9 | — | — | — | — | — |
| 12 | 0.5 | 9 | 9 | — | 9 | — | — | — | — | — |
|  | 2 | 9 | 9 | — | 9 | — | — | — | — | — |
|  | 5 | 9 | 9 | — | 9 | — | — | — | — | — |

| active substance No | amount applied in kg/ha | Ipomoea purpurea | Vicia sativa | wheat | cotton | oats | maize |
|---|---|---|---|---|---|---|---|
| 1 | 1 | — | — | 8 | — | — | — |
|  | 2 | — | — | 8 | — | — | — |
|  | 4 | — | — | 8 | — | — | — |
| 2 | 1 | — | — | 9 | 9 | — | — |
|  | 2 | — | — | 9 | 9 | — | — |
|  | 4 | — | — | 9 | 9 | — | — |
| 3 | 0.5 | 1 | 1 | 9 | — | 9 | 9 |
|  | 1 | 1 | 1 | 7 | — | 8 | 8 |
|  | 2 | 1 | 1 | 6 | — | 7 | 7 |
| 4 | 0.5 | 9 | 7 | 9 | — | 9 | 8 |
|  | 1 | 8 | 2 | 9 | — | 9 | 6 |
|  | 2 | 1 | 2 | 9 | — | 9 | 5 |
| 5 | 0.5 | 1 | 3 | 9 | — | 8 | 9 |
|  | 1 | 1 | 2 | 8 | — | 8 | 8 |
|  | 2 | 1 | 1 | 8 | — | 6 | 7 |
| 6 | 0.5 | 7 | 9 | 8 | 7 | 7 | 9 |
|  | 1 | 3 | 9 | 7 | 2 | 6 | 8 |
|  | 2 | 1 | 9 | 3 | 2 | 3 | 7 |
| 7 | 0.5 | 4 | 9 | 8 | 9 | 8 | 8 |
|  | 1 | 2 | 8 | 8 | 8 | 3 | 7 |
|  | 2 | 1 | 6 | 3 | 7 | 2 | 6 |
| 8 | 0.5 | 1 | 7 | 8 | 9 | 7 | 8 |
|  | 1 | 1 | 4 | 7 | 8 | 6 | 7 |
|  | 2 | 1 | 3 | 4 | 7 | 2 | 4 |
| 9 | 0.5 | 6 | 9 | 8 | — | 7 | 9 |
|  | 1 | 2 | 8 | 4 | — | 5 | 8 |
|  | 2 | 1 | 3 | 1 | — | 3 | 8 |
| 10 | 0.5 | 9 | 9 | 9 | — | 9 | 9 |
|  | 1 | 4 | 8 | 8 | — | 8 | 8 |
|  | 2 | 2 | 2 | 5 | — | 5 | 7 |
| 11 | 0.5 | — | — | — | — | — | — |
|  | 2 | — | — | — | — | — | — |
|  | 5 | — | — | — | — | — | — |
| 12 | 0.5 | — | — | — | — | — | — |
|  | 2 | — | — | — | — | — | — |
|  | 5 | — | — | — | — | — | — |

2. Herbicidal effect after emergence of the plants; weeds sown together with culture crop.

In seed trays, oats, wheat and maize as culture crop were sown together with the following weeds:
Lolium multiflorum
Digitaria sanguinalis
Amaranthus retroflexus
Papaver rhoeas
Sinapis alba
Matricaria chamomilla Galium aparine
Pastinaca sativa When the plants have reached the 4-leaf stade, they were treated with a 2 % aqueous emulsion of the active substance to be tested. The trays are then kept in a green-house at 25° to 28°C and 40 – 50 % humidity under daylight. The test was evaluated 15 days after the application of the active substance according to the following scale:

9 = plants undamaged, as control
1 = plants dead
9–2 = intermediary stages of damage The 2 % emulsion was prepared by diluting with water a 25 % emulsion-concentrate of the following composition:

25 parts of active substance, 32.5 parts of isophoron,

The following compounds were tested as active substance:

1. N-[3-trifluoromethyl-1,2,4-thiadiazolyl-(5)] N,N'-dimethyl-urea
2. N-[3-trifluoromethyl-1,2,4-thiadiazolyl(5)]-N' N'-dimethyl-urea
3. N-[3-trifluoromethyl-1,2,4-thiadiazolyl(5)]-N methyl-urea
4. N-[3-trifluoromethyl-1,2,4-thiadiazolyl(5)]-N methyl-N'-methoxy-urea
5. N-[3-trifluoromethyl-1,2,4-thiadiazolyl(5)]-N ethyl-N'-methyl-urea
6. N-[3-trifluoromethyl-1,2,4-oxadiazolyl(5)]-N',N dimethyl-urea
7. N-[3-dichloromethyl-1,2,4-thiadiazolyl(5)]-N' N'-dimethyl-urea

| Active substance No | Amount applied in kg/ha | Lolium multiflorum | Alopecurus myosuroides | Setaria italica | Digitaria sanguinalis | Amaranthus retroflexus | Papaver rhoeas | Sinapis alba | Matricaria chamomilla |
|---|---|---|---|---|---|---|---|---|---|
| 1 | 0.5 | 8 | — | 6 | — | 8 | 1 | 1 | 6 |
|  | 1 | 6 | — | 3 | — | 7 | 1 | 1 | 2 |
|  | 2 | 5 | — | 2 | — | 3 | 1 | 1 | 3 |
|  | 4 | 4 | — | 2 | — | 2 | 1 | 1 | 1 |
| 2 | 0.5 | 6 | — | 4 | — | — | 1 | 1 | 1 |
|  | 1 | 6 | — | 2 | — | — | 1 | 1 | 1 |
|  | 2 | 3 | — | 1 | — | — | 1 | 1 | 1 |
|  | 4 | — | — | — | — | — | — | — | — |
| 3 | 0.5 | 7 | 7 | 4 | 2 | 6 | 4 | 1 | 1 |
|  | 1 | 4 | 4 | 3 | 2 | 4 | 2 | 1 | 1 |
|  | 2 | 2 | 1 | 4 | 6 | 6 | 1 | 1 | 1 |
|  | 4 | 1 | 1 | 1 | 1 | 4 | 1 | 1 | 1 |
| 4 | 0.5 | 8 | 4 | 3 | 4 | 7 | 1 | 1 | 1 |
|  | 1 | 7 | 4 | 2 | 3 | 7 | 1 | 1 | 1 |
|  | 2 | 2 | 1 | 3 | 3 | 1 | 1 | 1 | 1 |
|  | 4 | 1 | 1 | 1 | 1 | 1 | 1 | 1 | 1 |
| 5 | 0.5 | 5 | 3 | 2 | 4 | 4 | 1 | 1 | — |
|  | 1 | 3 | 3 | 1 | 2 | 2 | 1 | 1 | — |
|  | 2 | 1 | 1 | 1 | 1 | 3 | 1 | 1 | 1 |
|  | 4 | 1 | 1 | 1 | 1 | 1 | 1 | 1 | 1 |
| 6 | 0.5 | — | — | — | — | — | 3 | 1 | 1 |
|  | 1 | — | — | — | — | — | 2 | 1 | 1 |
|  | 2 | — | — | — | — | — | 1 | 1 | 1 |
|  | 4 | — | — | — | — | — | 1 | 1 | 1 |
| 7 | 0.5 | 6 | 7 | 3 | 3 | 2 | 9 | 1 | 1 |
|  | 1 | 6 | 7 | 2 | 2 | 1 | 3 | 1 | 1 |
|  | 2 | 3 | 3 | 1 | 1 | 1 | 1 | 1 | 1 |
|  | 4 | 2 | 2 | 1 | 1 | 1 | 1 | 1 | 1 |

| Active substance No | Amount applied in kg/ha | Galium aparine | Pastinaca sativa | oats | wheat | maize |
|---|---|---|---|---|---|---|
| 1 | 0.5 | 3 | 4 | — | 8 | — |
|  | 1 | 3 | 2 | — | 7 | — |
|  | 2 | 1 | 1 | — | 7 | — |
|  | 4 | 1 | 1 | — | 4 | — |
| 2 | 0.5 | 1 | 3 | — | 8 | — |
|  | 1 | 1 | 1 | — | 6 | — |
|  | 2 | 1 | 1 | — | 5 | — |
|  | 4 | — | — | — | — | — |
| 3 | 0.5 | 4 | 2 | 9 | 9 | — |
|  | 1 | 2 | 2 | 8 | 8 | — |
|  | 2 | 1 | 1 | 8 | 9 | — |
|  | 4 | 1 | 1 | 8 | 9 | — |
| 4 | 0.5 | 4 | 2 | 9 | 7 | — |
|  | 1 | 3 | 1 | 8 | 8 | — |
|  | 2 | 2 | 1 | 8 | 8 | — |
|  | 4 | 2 | 1 | 7 | 7 | — |
| 5 | 0.5 | 4 | 8 | 8 | 7 | 7 |
|  | 1 | 3 | 7 | 7 | 6 | 6 |
|  | 2 | 1 | 9 | 1 | 1 | 5 |
|  | 4 | 1 | 9 | 1 | 1 | 4 |
| 6 | 0.5 | 3 | 5 | 7 | 9 | 8 |
|  | 1 | 3 | 4 | 7 | 9 | 8 |
|  | 2 | 2 | 2 | 3 | 8 | 8 |
|  | 4 | 1 | 1 | 3 | 7 | 8 |
| 7 | 0.5 | 9 | 2 | 9 | 9 | 9 |
|  | 1 | 8 | 1 | 8 | 8 | 8 |
|  | 2 | 8 | 1 | 7 | 7 | 7 |
|  | 4 | 7 | 1 | 5 | 6 | 3 |

32.5 parts of methyl ethyl ketone, 10 parts of a combination emulgator consisting of nonyl phenol-oxy ethylene and dodecyl benzyl sulfonic acid-Ca-salt.

The preceding tests demonstrate the broad range of the herbicidal effect of the active substances according to the invention. In contrast thereto, known thiadiazo ureas, for example the 5-alkyl-1,3,4-thiadiazolyl(2)-eas of Dutch patent specification open to public inection No. 68.13438 and the 1,2,4-thiadiazolyl(5)-eas of Dutch patent specification open to public inection No. 68.13437 have only limited herbicidal efct even in application amounts of 5 kg per hectare. For the preparation of herbicidal agents, the active bstances are mixed with suitable carriers and/or dis-rsing agents. To widen the range of action, these ents can be admixed with other herbicides, for example triazines such as halogen-diamino-s-triazines, alxy- and alkylthiodiamino-s-triazines, triazoles, diaies such as uracils, aliphatic carboxylic acids and logen carboxylic acids, halogenated benzoic acids d phenylacetic acids, aryloxyalkane carboxylic acids, drazides, amides, nitriles, esters of such carboxylic ids, carbamic and thiocarbamic acid esters, ureas, c.

The following examples illustrate the production of e new ureas. Other ureas of the Formula I which were oduced according to the procedures described in the amples are found in the table following. The temperures are given in degrees centigrade.

EXAMPLE 1

20 g of N-[3-trifluoromethyl-1,2,4-thiadiazolyl(5)]-phenyl carbamate and 1 ml of triethyl amine are ated under reflux in 200 ml of benzene. To the boilg solution there are added dropwise 5.4 g of methyl ine, dissolved in 50 ml of benzene. The reaction ixture is refluxed for 1 hour and then stirred for 12 urs at room temperature. The precipitate is removed filtration and washed with benzene and the with peleum ether. After drying and recrystallization from ethanol/water, the N-[3-trifluoromethyl-1,2,4-iadiazolyl(5)]-N'-methyl-urea has a melting point of 7°–219°C.

EXAMPLE 2

A solution of 14.9 g of cyclopropyl amine in 20 ml of nzene is added dropwise with stirring to a boiling sotion of 32 g of N-[3-trifluoromethyl-1,2,4-iadiazolyl(5)]-O-phenyl carbamate and 1.4 ml of trihyl amine in 300 ml of benzene. After refluxing for hours, the solvent is concentrated by evaporation in cuo, and the residue is recrystallized from methanol/-ter. The N-[3-trichloromethyl-1,2,4-iadiazolyl(5)]-N'-cyclopropyl-urea has a melting int of 177°–180°C.

EXAMPLE 3

1.8 ml of triethyl amine and 17.5 ml of methyl isocyate are added to a solution of 27 g of 3-trichlorometh-5-methylamino-1,2,4-thiadiazole in 350 ml of acene and refluxed for 24 hours. The solvent is then reved by distillation in vacuo, and the residue is reystallized from alcohol/water. The N-[3-triloromethyl-1,2,4-thiadiazolyl(5)]-N,N'-dimethyl-ea has a melting point of 146°–150°C.

EXAMPLE 4

A solution of 3.2 g of α-amino-isobutyric acid nitrile d 4.75 ml of triethyl amine in 150 ml of benzene are ded dropwise to a boiling solution of 10 g of N-[3-triloromethyl-1,2,4-thiadiazolyl(5)]-N-methyl-carmoyl-chloride in 100 ml of benzene. The reaction xture is refluxed for 16 hours. The precipitate which parates is then removed and washed several times with water. After recrystallization from dioxane, the N-[3-trichloromethyl-1,2,4-thiadiazolyl(5)]-N-methyl-N'-(1'-methyl-1'-cyano-ethyl)-urea has a melting point of 255°(with decomposition).

EXAMPLE 5

A mixture of 16.9 g of 3-trifluoromethyl-5-amino-1,2,4-thiadiazole and 50 ml of dimethyl-carbamoyl chloride is stirred at a bath temperature of 160°C for 5 hours. After this mixture has been allowed to cool it is poured into ice-water and the pH is adjusted to 5–6 by means of aqueous NaOH. An oil separates, which crystallizes after a short time. The precipitate is filtered, washed with water and then added while stirring to 100 ml of 2N aqueous ammonia solution. The solution is filtered and the filtrate is added with aqueous hydrochloric acid until slightly acid. A precipitate forms, which is filtered and dried. After recrystallisation from benzene 8.5 g of N-[3-trifluoromethyl-1,2,4-thiadiazolyl(5)]-N',N'-dimethyl-urea melting point 124°–126°C is obtained.

EXAMPLE 6

A mixture of 20.6 g of 3-trichloromethyl-5-amino-1,2,4-thiadiazole, 10 ml of methyl isocyanate and 100 ml of pyridine are stirred for 2 days at 80°C. The solution is then concentrated under vacuum and the dark residue is boiled with diisopropylether. The ethereal solution is allowed to dry, filtered and the solvent is then removed under vacuum. The residue is recrystallized twice from aqueous methanol and yields 12 g of N-[3-trichloromethyl-1,2,4-thiadiazolyl(5)]-N'-methyl-urea melting point 195°C (with decomposition).

| Active substance | melting point: |
|---|---|
| N-[3-trifluoromethyl-1,2,4-thiadiazolyl(5)]-N,N'-dimethyl-urea | 148–152° |
| N-[3-trichloromethyl-1,2,4-thiadiazolyl(5)]-N',N'-dimethyl-urea | 133° decomposition |
| N-[3-trichloromethyl-1,2,4-thiadiazolyl(5)]-N-methyl-N'-ethyl-urea | 156–158° |
| N-[3-trichloromethyl-1,2,4-thiadiazolyl(5)]-N,N'-N'-trimethyl-urea | 154–156° |
| N-[3-trifluoromethyl-1,2,4-thiadiazolyl(5)]-N-methyl-N'-cyclopropyl-urea | 126–128° |
| N-[3-trifluoromethyl-1,2,4-thiadiazolyl(5)]-N-methyl-N'-ethyl-urea | 116–118° |
| N-[3-trifluoromethyl-1,2,4-thiadiazolyl(5)]-N-methyl-N'-isopropyl-urea | 89–90° |
| N-[3-trifluoromethyl-1,2,4-thiadiazolyl(5)]-N'-methyl-N'-(1-methyl-propin-3-yl)-urea | 91–93° |
| N-[3-trichloromethyl-1,2,4-oxadiazolyl(5)]-N'-methyl-urea | 277° decomposition |
| N-[3-trichloromethyl-1,2,4-oxadiazolyl(5)]-N'-methoxy-N'-methyl-urea | 176–179° |
| N-[3-trifluoromethyl-1,2,4-oxadiazolyl(5)]-N,N'-dimethyl-urea | 80–82° |
| N-[3-trichloromethyl-1,2,4-thiadiazolyl(5)]-N'-methyl-N'-(1-methyl-propin-3-yl)-urea | 156–159° |
| N-[3-trichloromethyl-1,2,4-thiadiazolyl(5)]-N-methyl-N'-propyl-urea | 133–135° |
| N-[3-trifluoromethyl-1,2,4-thiadiazolyl(5)]-N'-methoxy-N'-methyl-urea | 79–80° |
| N-[3-trifluoromethyl-1,2,4-thiadiazolyl(5)]-N-methyl-N'-allyl-urea | 109–110° |
| N-[3-trifluoromethyl-1,2,4-thiadiazolyl(5)]-N,N'-N'-trimethyl-urea | 117–120° |
| N-[3-trichloromethyl-1,2,4-thiadiazolyl(5)]-N-ethyl-N'-methyl-urea | 164–166° |
| N-[3-trifluoromethyl-1,2,4-thiadiazolyl(5)]-N-ethyl-N'-methyl-urea | 139–141° |
| N-[3-trifluoromethyl-1,2,4-oxadiazolyl(5)]-N',N'-dimethyl-urea | 102–104° |
| N-[3-trifluoromethyl-1,2,4-oxydiazolyl(5)]-N,N'-dimethyl-urea | 72–74° |
| N-[3-trichloromethyl-1,2,4-thiadiazolyl(5)]-N-methyl-N'-(β-methoxyethyl)-urea | 113–114° |
| N-[3-trifluoromethyl-1,2,4-oxadiazolyl(5)]- | |

-continued

| Active substance | melting point: |
|---|---|
| N'-methyl-urea | 184–186° |
| N-[3-trichloromethyl-1,2,4-thiadiazolyl(5)]-N-methyl-N'-allyl-urea | 111–114° |
| N-[3-trifluoromethyl-1,2,4-thiadiazolyl(5)]-N-methyl-N'-n-propyl-urea | 116–118° |
| N-[3-trifluoromethyl-1,2,4-thiadiazolyl(5)]-N'-(3''-chlor-2''-butenyl)-urea | |
| N-[3-dichloromethyl-1,2,4-thiadiazolyl(5)]-N'-(3''-chlor-2''-butenyl)-urea | |
| N-[3-dichloromethyl-1,2,4-thiadiazolyl(5)]-N,N'-dimethyl-urea | 148–150° |
| N-[3-dichloromethyl-1,2,4-thiadiazolyl(5)[-N,N',N'-trimethyl-urea | 106–108° |
| N-[3-dichloromethyl-1,2,4-thiadiazolyl(5)]-N-methyl-N'-ethyl-urea | 135–137° |
| N-[3-dichloromethyl-1,2,4-thiadiazolyl(5)]-N-methyl-N'-isopropyl-urea | 121–123° |
| N-[3-dichloromethyl-1,2,4-thiadiazolyl(5)]-N-methyl-N'-(1''-methyl-propinyl)-urea | 83–85° |
| N-[3-dichloromethyl-1,2,4-thiadiazolyl(5)]-N'-methyl-urea | 222–224° |
| N-[3-dichloromethyl-1,2,4-thiadiazolyl(5)]-N',N'-dimethyl-urea | 90–92° |
| N-[3-(1'',1''-dichloro-3''-methyl-butyl)-1,2,4-thiadiazolyl(5)]-N',N'-dimethyl-urea | |

In the following are examples which are given to illustrate the production of the starting materials of Formula II and the production of the carbamic acid derivatives. In the table following, there are listed several oxadiazoles which have not been previously described as well as some phenyl carbamates.

EXAMPLE A

A solution of 15.4 ml of triethyl amine in 25 ml of benzene are slowly added dropwise with stirring at 25°–30°C to a suspension of 17.7 g of 2,2,2-trichloroacetamidoxime [J. Het. Chem. 3, 214 (1966)] and 11.6 g of cyanogen bromide in 200 ml of benzene. The reaction mixture is stirred for seven 1 hours at room temperature, the resultant yellow precipitate is then removed by filtration and washed thoroughly with water. After drying, 15.3 g of 3-trichloromethyl-5-amino-1,2,4-oxadiazole, having a melting point of 160°–163°C, are obtained. After recrystallizing once from methanol/water, the melting point rises to 165°–168°.

EXAMPLE B 302.5 g of 3-trifluoromethyl-5-amino-1,2,4-thiadiazole (m.p. 188°–190°) are refluxed together with 271 ml of phenyl chloroformate and 27.7 ml of dimethyl formamide in 2 l of chlorobenzene for 5 hours. Simultaneously dry nitrogen gas is introduced to remove the HCl gas which forms during the reaction. After cooling, the precipitate is removed and washed with chlorobenzene and petroleum ether. 355 g of N-[3-trifluoromethyl-1,2,4-thiadiazolyl(5)]-O-phenyl carbamate, m.p. 181°–183°C.

EXAMPLE C 44.2 ml of phenyl chloroformate are added dropwise at 20°–30° with stirring to a solution of 58.4 g of 3-trifluoromethyl-5-methylamino-1,2,4-thiadiazole (A) (m.p. 124°–125°) and 49 ml of triethylamine in 600 ml of dioxane. After stirring at room temperature for several hours, the triethylamine hydrochloride which precipitates is separated and the filtrate is concentrated under vacuum. The residue crystallizes from isopropanol. The N-[3-trifluoromethyl-1,2,4-thiadiazolyl(5)]-N-methyl-O-phenyl carbamate has a melting point 127°–129°.

EXAMPLE D

A mixture of 178.3 g of 3-trichloromethyl-5-methylamino-1,2,4-thiadiazole and 2 l of absolute benzene are heated under reflux while stirring. During period of 7 hours, 36 l of phosgene are then introduced into this reaction mixture. After this, the mixture stirred for another 2 hours at reflux temperature and 1 hours at room temperature. The reaction-mixture then concentrated in a rotatory-evaporator. The residue is recrystallized twice from cyclohexane to yield 191 g of N-[3-trifluoromethyl-1,2,4-thiadiazolyl(5) N-methyl-carbamoyl-chloride, melting point 93°–95°.

EXAMPLE E

To a stirred mixture of 138 g 3-trifluoromethyl-5-amino-1,2,4-oxadiazole and 280 ml of triethylamine in 1.5 l of dioxam are added dropwise 253 ml of O-phenyl-chloroformiate. The temperature of the reaction mixture rises to 70° during this addition. The reaction mixture is stirred at room temperature during one night and the precipitated triethylamine-hydrochloride then filtered off. The filtrate is concentrated under vacuum and the residue is recrystallized from diisopropylether to yield 265 g of 3-trifluoromethyl-5-(dicarbophenoxy-amino)-1,2,4-oxadiazole, melting point 120°–122°C.

EXAMPLE F 255 g of 2,2,2-trifluoroacetamidoxim are introduced with stirring and cooling well to temperatures below 40° into 890 ml of trichloroacetic anhydride. After the exothermic reaction has subsided, the mixture is heated for 1½ hours at 100°. After cooling, the reaction mixture is poured into ice water. The aqueous phase is extracted several time with ether; the ether extracts are combined with the organic phase and dried. After the solvent has been removed by distillation, the residue fractionated. The 3-trifluoromethyl-5-trichloromethyl-1,2,4-oxadiazole has a boiling point of 42°–44°/ 1 Torr.

A solution of 29.3 g of ammonia in 500 ml of methanol is added dropwise to a solution of 200 g of 3-trifluoromethyl-5-trichloromethyl-1,2,4-oxadiazole (A in one liter of benzene. After the exothermic reaction has subsided, the mixture is stirred for 16 hours at room temperature and then the solvent mixture is removed by distilling under vacuum. The crystalline residue made into a paste with a small amount of water and washed. The 3-trifluoromethyl-5-amino-1,2,-oxadiazole has a melting point of 103°–105°.

EXAMPLE G 110 g of 3-trifluoromethyl-5-amino-1,2,4-thiadiazo are dissolved in 2.5 l of methanol puriss, and the treated in the presence of 25 g Palladium-charcoal 5 at room temperature under atmospheric pressure After 20 hours the hydration ceases. The catalyst is filtered off and the filtrate is concentrated under vacuum until dryness. The residue is crystallized from ethanol water and yields 59 g of 3-dichloromethyl-5-amino-1,2,4-thiadiazole, melting point 164°–166°.

Analogously to this example, 3-dichloromethyl-methylamino-1,2,4-thiadiazole, melting point 122°–126° was prepared.

The intermediary products listed below were prepared according to the Examples A to G.

| compounds: | melting point |
|---|---|
| trifluoromethyl-5-amino-1,2,4-thiadiazole | 188 – 190° |
| trifluoromethyl-5-methylamino-1,2,4-thiazole | 124 – 125° |
| trichloromethyl-5-amino-1,2,4-thiadiazole | 195 – 197° |
| trichloromethyl-5-methylamino-1,2,4-thiazole | 198 – 200° |
| -[3-trifluoromethyl-1,2,4-thiadiazole(5)]--methyl-carbamoyl-chloride | 43 – 45° |
| -[3-trichloromethyl-1,2,4-thiadiazole(5)]--methyl-O-phenyl-carbamate | 85 – 87° |
| -[3-trichloromethyl-1,2,4-thiadiazole(5)]--phenyl-carbamate | 167 – 169° |
| trichloromethyl-1,2,4-thiadiazoyl(5)-N-hyl-carbamoyl-chloride | 23 – 25° |
| trifluoromethyl-1,2,4-thiadiazolyl(5)-N-hyl-carbamoyl-chloride | 28 – 30° |
| -[dichloromethyl-1,2,4-thiadiazolyl(5)]--methyl-carbamoyl-chloride | 64 – 66° |
| -[dichloromethyl-1,2,4-thiadiazolyl(5)]-phenyl-carbamate | 168 – 170° |
| trichloromethyl-5-methylamino-1,2,4-;adiazole | 68 – 70° |
| trifluoromethyl-5-methylamino-1,2,4-;adiazole | 49 – 50° |
| -[3-trifluoromethyl-1,2,4-oxadiazole(5)]--methyl-O-phenyl-carbamate | 66 – 68° |
| -[3-trichloromethyl-1,2,4-oxadiazole(5)]--methyl-O-phenyl-carbamate | 108 – 110° |
| -[3-trichloromethyl-1,2,4-oxadiazole(5)]--phenyl-carbamate | 163 – 166° |
| -[3-trichloromethyl-1,2,4-oxadiazole(5)]--methyl-carbamoyl-chloride | 49 – 50° |

The production of herbicidal agents according to the invention is performed in a known manner by intimate mixing and grinding of active substances of the general formula I together with suitable carriers, optionally with the addition of dispersing agents or solvents, which are inert towards the active substances. The active substances can be prepared in the following forms:

solid preparations: dusts, scattering agents, granulates, (coated granulates, impregnated granulates and homogeneous granulates);

water-dispersible concentrates of the active substance: wettable powders, pastes, emulsions;

liquid preparations: solutions.

To produce solid application forms (dusts, scattering agents, granulates), the active substances are mixed with solid carriers. Suitable carriers are, for example, kaolin, talcum, bole, loess, chalk, limestone, ground limestone, Attaclay, dolomite, diatomaceous earth, precipitated silicic acid, alkaline earth silicates, sodium and potassium aluminium silicates (fledspar and mica), calcium and magnesium sulphates, magnesium oxide, ground synthetic plastics, fertilizers such as ammonium sulphate, ammonium phosphate, ammonium nitrate, urea, ground vegetable products such as bran, bark dust, sawdust, ground nutshells, cellulose powder, residues of plant extractions, active charcoal, etc., alone or in admixture with each other.

The particle size of the carriers is, for dusts advantageously up to about 0.1 mm, for scattering agents from about 0.075 to 0.2 mm, and for granulates 0.2 mm or coarser.

The concentrations of active substance in the solid preparations are from 0.5 to 80%.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulfonic acid, their alkali metal and alkaline earth metal salts, polyethylene glycol ethers (carbowaxes), fatty alcohol polyglycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e., wettable powders, pastes and emulsion concentrates, are agents which can be diluted with water to any concentration desired. They consist of active substance, carrier, optionally additives which stabilize the active substance, surface-active substances and anti-foam agents and, optionally, solvents. The concentration of active substance in these agents is 5 to 80%.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleyl methyl tauride, ditertiary acetylene glycols, dialkyl dilauryl ammonium chloride and fatty acids alkali and alkaline earth metal salts.

Suitable anti-foam agents are silicones.

The active substances are so mixed, ground, sieved and strained with the additives mentioned above that, in wettable powders, the solid particle size of from 0.02 to 0.04 and in pastes, of 0.03 is not exceeded. To produce emulsion concentrates and pastes, dispersing agents such as those given in the previous paragraphs, organic solvents and water are used. Examples of suitable solvents are the following: alcohols, benzene, xylenes, toluene, dimethyl sulfoxide, and mineral oil fractions boiling between 120° and 350°C. The solvents must be practically odorless, not phytotoxic, inert to the active substances and not readily inflammable.

Furthermore, the agents according to the invention can be applied in the form of solutions. For this purpose the active substance or several active substances of general Formula I are dissolved in suitable organic solvents, mixtures of solvents or in water, Aliphatic and aromatic hydrocarbons, chlorinated derivatives thereof, alkyl naphthalenes and mineral oils, alone or mixed with each other can be used as organic solvents. The solution should contain the active substances in a concentration of from 1 to 20%.

The agents described according to the invention can be mixed with other biocidally active compounds or agents. Thus, to broaden the range of action, the new agents can contain, e.g., insecticides, fungicides, bactericides, fungistatics, bacteriostatics or nematocides in addition to the compounds mentioned of the general Formula I. The agents according to the invention can also contain plant fertilizers, trace elements, etc.

In the following, forms of preparation of the new ureas are described. "Parts" mean parts by weight.

GRANULATE

The following ingredients are used to produce a 5% granulate:

5 parts of N-[3-trifluoromethyl-1,2,4-thiadiazolyl(5)]-N,N'-dimethyl-urea,
0.25 part of epichlorohydrin,
0.25 part of cetyl polyglycol ether,
3.50 parts of polyethylene glycol
91 parts of kaolin (granular size 0.3 – 0.8 mm).

The active ingredient is mixed with epichlorohydrin and dissolved in 6 parts of acetone, then the polyethylene glycol and cetyl polyglycol ether are added. The resulting solution is sprayed onto the kaolin and then evaporated in vacuum.

WETTABLE POWDER

The following components are used for the preparation of
a. 50%, b) 25% and c) 10% wettable powders:
a.
50 parts of N-[3-trifluoromethyl-1,2,4-thiadiazolyl(5)]-N',N'-dimethyl-urea,
5 parts of sodium dibutylnaphthyl sulphonate,
3 parts of naphthalene sulphonic acid/phenol sulphonic acid/formaldehyde condensation product 3:2:1,
20 parts of kaolin,
22 parts of Champagne chalk;
b.
25 parts of N-[3-trifluoromethyl-1,2,4-thiadiazolyl(5)]-N,N'-dimethyl-urea,
5 parts of the sodium salt of oleoylmethyl tauride,
2.5 parts of naphthalene sulphonic acid/formaldehyde condensation product,
0.5 part of carboxymethyl cellulose,
5 parts of neutral potassium aluminum silicate,
62 parts of kaolin;
c.
10 parts of N-[3-trichloromethyl-1,2,4-thiadiazolyl(5)]-N-methyl-N'-cyclopropyl-urea,
3 parts of a mixture of sodium salts of saturated fatty alcohol sulphates,
5 parts of naphthalene sulphonic acid/formaldehyde condensation product,
82 parts of kaolin.

The given active ingredient is absorbed onto the corresponding carriers (kaolin and chalk) and then mixed and ground. Wettable powders having excellent wettability and suspensibility are obtained. By dilution with water, suspensions of any desired concentration of the active ingredients can be obtained from such wettable powders. Such suspensions are suitable for the control of weeds and wild grasses in cultivated plantations.

PASTE

The following ingredients are used for the preparation of a 45% paste:

45 parts of N-[3-trifluoromethyl-1,2,thiadiazolyl(5)]-N,N'-dimethyl-urea,
5 parts of sodium aluminum silicate,
14 parts of cetyl polyglycol ether having 8 mol of et ylene oxide,
1 part of oleyl polyglycol ether having 8 mol of eth ene oxide,
2 parts of spindle oil,
10 parts of polyethylene glycol,
23 parts of water.

The active ingredient is intimately mixed and grou in suitable equipment with the additives. A paste is o tained which can be diluted with water to prepare st pensions of any desired concentration. The suspensio are suitable for the treatment of vegetable plantatio

EMULSION CONCENTRATE

To prepare a 10% emulsion concentrate
10 parts of N-[3-trifluoromethyl-1,2, thiadiazolyl(5)]-N',N'-dimethyl-urea,
15 parts of oleyl polyglycol ether having 8 mol of et ylene oxide, and
75 parts of isophorone
are mixed together. This concentrate can be dilut with water to form emulsions of suitable concentr tions. Such emulsions are suitable for the control weeds in cultivated plants such as cotton, maize, et

What we claim is:

1. A herbicidal composition for combatting weeds crop cultures which comprises a herbicidally effecti amount of a compound of the formula

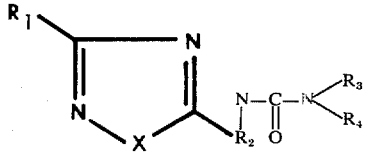

wherein
R₁ represents α-halogen lower alkyl,
R₂ and R₃ each independently represents hydrogen lower alkyl,
R₄ represents lower alkyl optionally substituted cyano or alkoxy of from 1 to 4 carbon atoms, cloalkyl of from 3 to 10 carbon atoms, alkoxy from 1 to 4 carbon atoms, alkenyl or halogenoalk nyl of 3 or 4 carbon atoms, or alkynyl of 3 to 4 c bon atoms, and
X represents oxygen or sulphur;
together with a suitable carrier therefor.

2. The composition of claim 1, wherein in said co pound X is sulphur.

3. The composition of claim 2, wherein said co pound is N-[3-trifluoromethyl-1,2,4-thiadiazolyl(5 N,N'-dimethyl-urea.

4. The composition of claim 2, wherein said co pound is N-[3-trifluoromethyl-1,2,4-thiadiazolyl(5 N', N'-dimethyl-urea.

5. The composition of claim 2, wherein said co pound is N-[3-trifluoromethyl-1,2,4-thiadiazolyl(5 N'-methyl-urea.

6. The composition of claim 2, wherein said co pound is N-[3-trifluoromethyl-1,2,4-thiadiazolyl(5 N-ethyl-N'-methyl-urea.

7. The composition of claim 2, wherein said co pound is N-[3-dichloromethyl-1,2,4-thiadiazolyl(5 N'-methyl-urea.

8. The composition of claim 2, wherein said co pound is N-[3-dichloromethyl-1,2,4-thiadiazolyl(5

N',N'-dimethyl-urea.

9. The composition of claim 2, wherein said compound is N-[3-dichloromethyl-1,2,4-thiadiazolyl(5)]-N',N'-dimethyl-urea.

10. The composition of claim 2, wherein said compound is N-[3-trifluoromethyl-1,2,4-thiadiazolyl(5)]-N'-methyl-N'-methoxy-urea.

11. The composition of claim 1, wherein in said compound X is oxygen.

12. The composition of claim 11, wherein said compound is N-[3-trifluoromethyl-1,2,4-oxadiazolyl(5)]-N',N'-dimethyl-urea.

13. A method for combatting weeds in crop cultures which comprises applying to the crop area a herbicidally effective amount of a compound according to the formula of claim 1.

14. The method of claim 13, wherein in said compound X is sulphur.

15. The method of claim 13, wherein in said compound X is oxygen.

* * * * *